US012085836B2

(12) United States Patent
Kazama et al.

(10) Patent No.: US 12,085,836 B2
(45) Date of Patent: Sep. 10, 2024

(54) OPTICAL AMPLIFIER

(71) Applicant: Nippon Telegraph and Telephone Corporation, Tokyo (JP)

(72) Inventors: Takushi Kazama, Musashino (JP); Takeshi Umeki, Musashino (JP); Takahiro Kashiwazaki, Musashino (JP); Osamu Tadanaga, Musashino (JP); Koji Embutsu, Musashino (JP); Nobutatsu Koshobu, Musashino (JP); Asuka Inoue, Musashino (JP); Ryoichi Kasahara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 28 days.

(21) Appl. No.: 18/010,899

(22) PCT Filed: Jul. 29, 2020

(86) PCT No.: PCT/JP2020/029028
§ 371 (c)(1),
(2) Date: Dec. 16, 2022

(87) PCT Pub. No.: WO2022/024253
PCT Pub. Date: Feb. 3, 2022

(65) Prior Publication Data
US 2023/0236473 A1 Jul. 27, 2023

(51) Int. Cl.
*G02F 1/39* (2006.01)
*G02F 1/35* (2006.01)
(Continued)

(52) U.S. Cl.
CPC ............ *G02F 1/392* (2021.01); *G02F 1/3501* (2013.01); *G02F 1/39* (2013.01); *G02F 1/395* (2013.01);
(Continued)

(58) Field of Classification Search
CPC .... G02F 1/3501; G02F 1/3548; G02F 1/3551; G02F 1/39; G02F 1/392; G02F 1/395; H01S 3/1086
See application file for complete search history.

(56) References Cited

U.S. PATENT DOCUMENTS 11,740,537 B2 * 8/2023 Umeki .................... G02F 1/377
359/328
2023/0053856 A1 * 2/2023 Kazama ............... H04B 10/548

FOREIGN PATENT DOCUMENTS

JP 2013182140 A * 9/2013 ............... G02F 1/39

OTHER PUBLICATIONS

M. H. Chou et al., *Stability and Bandwidth Enhancement of Difference Frequency Generation (DFG)-Based Wavelength Conversion by Pump Detuning*, Electronics Letters, vol. 35, No. 12, Jun. 10, 1999, pp. 978-980.
(Continued)

*Primary Examiner* — Daniel Petkovsek
(74) *Attorney, Agent, or Firm* — Workman Nydegger

(57) ABSTRACT

An optical amplifier of the present disclosure includes a Raman amplification unit and a parametric amplification unit that is configured of a second-order nonlinear element including a PPLN waveguide. In the optical amplifier, second harmonic lights are generated from a fundamental wave light having a wavelength that is slightly detuned to a shorter wavelength side with respect to a phase matching wavelength of the second-order nonlinear element, and is utilized as excitation light for the parametric amplification unit. By utilizing the excitation light based on the fundamental wave light of the wavelength detuned from the phase matching wavelength, a phase matching curve can be obtained in a wide band in a difference frequency generation (DFG) process of the second-order nonlinear element. The reduction in conversion efficiency of the wavelength near (Continued)

the excitation light in the parametric amplification unit is compensated by the Raman amplification unit.

5 Claims, 6 Drawing Sheets

(51) Int. Cl.
*H01S 3/00* (2006.01)
*H01S 3/108* (2006.01)
*G02F 1/355* (2006.01)

(52) U.S. Cl.
CPC .......... *H01S 3/0092* (2013.01); *H01S 3/1086* (2013.01); *G02F 1/35* (2013.01); *G02F 1/3548* (2021.01); *G02F 1/3551* (2013.01)

(56) References Cited

OTHER PUBLICATIONS

Takeshi Umeki et al., *Phase Sensitive Degenerate Parametric Amplification Using Directly-Bonded PPLN Ridge Waveguides*, Optics Express, vol. 19, No. 7, Mar. 28, 2011, pp. 6326-6332.

* cited by examiner

OPTICAL AMPLIFIER

TECHNICAL FIELD

The present invention relates to an optical amplifier used in an optical communication system or a laser device.

BACKGROUND ART

In an optical communication system, an erbium-doped fiber amplifier (EDFA) is widely used to relay signals attenuated by propagation through an optical fiber. In the EDFA, excitation light is incident on an optical fiber (EDF) obtained by adding an erbium to an optical fiber, and the incident light is amplified by induced emission in the EDF. The optical signal can be amplified as light without performing optical-electric-optical conversion by the practical use of the EDFA. Furthermore, a wavelength division multiplexing (WDM) signal for transmitting a plurality of wavelengths with different information can be collectively amplified. The optical signal can be amplified and relayed with a simple configuration, and the cost of optical relay can be remarkably reduced. In particular, it is no exaggeration to say that an entire optical communication network for long distance transmission is designed on the assumption that an EDFA is used.

Due to the recent diversification of information communication technology services, an optical communication system supporting a backbone of the communication network is required to further increase a transmission capacity. According to Shannon's communication theorem, the frequency utilization efficiency given by the ratio of the transmission capacity per unit frequency band is given by $\log_2(1+S/N)$ with respect to a signal-to-noise ratio (S/N). Therefore, the upper limit of the S/N ratio determines the upper limit of the principle transmission capacity. Under the condition that the shot noise becomes dominant, the S/N ratio in the receiver of the optical communication system is proportional to the power of the optical signal. Therefore, in order to improve the frequency utilization efficiency of the optical communication system, transmission is performed with the optical power as high as possible in principle. In practice, an optical fiber which is a transmission medium for optical communication has a nonlinear optical effect. Due to the nonlinear optical effect, if the transmission power is increased more than necessary, the S/N ratio of the optical signal deteriorates. The degradation of the S/N ratio is called a nonlinear Shannon limit, and is known as a phenomenon of limiting the upper limit of the transmission capacity of the optical communication system.

In order to further increase the communication capacity beyond the above-described nonlinear Shannon limit, it is necessary to expand the frequency band used for optical communication.

CITATION LIST

Non Patent Literature

[Non Patent Literature 1] M. H. Cheo, I. Brener, K. R. Parameswaran and M. M. M. Fejer, "Stability and bandwidth enhancement of difference frequency generation (DFG)-based wavelength conversion by pump detuning", ELECTRONICS LETTERS 10 Jun. 1999, vol. 35, No. 12, pp. 978-990

[Non Patent Literature 2] T. Umeki, O. Tadanaga, A. Takada, and M. Asobe, "Phase sensitive degenerate parametric amplification using directly-bonded PPLN ridge waveguides," Opt. Express, Vol. 19 No. pp. 6326-6332 (2011)

SUMMARY OF INVENTION

Technical Problem

However, in an optical communication system using an EDFA, there has been a problem that the band of an actually available optical amplifier is limited. The wavelength bands which can be amplified by an EDFA widely used in optical communication systems are limited to only a C band (1530 to 1565 nm) and an L band (1565 to 1625 nm). Therefore, the present optical communication system is constructed on the assumption that these wavelength bands are utilized. Since a transparent wavelength band of the optical fiber itself is very wide, if the optical amplifier can be used in a wavelength band other than the above-described two bands, the transmission capacity of the optical communication can be greatly increased.

For an optical amplification technique similar to that of an EDFA, an optical amplifier using an optical fiber to which Ytterbium is added (ytterbium doped fiber amplifier: YDFA) has been developed. The wavelength band which can be amplified by a YDFA is a 1.06 μm band, and in this wavelength band, a single mode fiber (SMF) normally used in the optical communication system no longer uses single mode propagation. An SMF is not suitable for high-speed signal transmission in the 1.06 μm band, and a special optical fiber other than an SMF is required to configure an optical communication system using a YDFA. Finally, if a YDFA is used in an optical communication system, there will be problems with compatibility with the existing optical fiber communication network.

The present invention has been made in view of such a problem, and it is an object of the present invention to provide an optical amplifier for amplifying an optical signal with a wide bandwidth including a wavelength band that cannot be amplified by an EDFA.

Solution to Problem

An optical amplifier according to one embodiment of the present invention includes a Raman amplification unit for receiving signal light, an excitation light generation unit configured to generate second harmonic lights from fundamental wave light, a parametric amplification unit connected to the Raman amplification unit including a first branching unit that separates the amplified signal light from the Raman amplification unit into a longer wavelength band and a shorter wavelength band of the wavelength of the fundamental wave light, a first second-order nonlinear element for parametric amplification of the separated signal light on the longer wavelength band using the second harmonic lights as excitation light, a second second-order nonlinear element for parametric amplification of the separated signal light on the shorter wavelength band using the second harmonic lights as excitation light, and a second branching unit that removes wavelength conversion light beams from each of the first second-order nonlinear element and the second second-order nonlinear element, and multiplexes and outputs the amplified signal light beams from the first second-order nonlinear element and the second second-order nonlinear element, and a light source for generating excitation light of the Raman amplification unit, in which the excitation light propagates through the second second-order nonlinear element in a direction opposite to the signal light, is parametric-amplified, and is supplied to the Raman amplification unit, in which the fundamental wave light has a wavelength detuned to a shorter wavelength side than phase matching wavelengths of the first second-order nonlinear element and the second second-order nonlinear element.

Advantageous Effects of Invention

According to the present invention, an optical amplifier for amplifying an optical signal with a wide bandwidth including a wavelength band that cannot be amplified by an EDFA can be provided.

DESCRIPTION OF EMBODIMENTS

Figure 1:
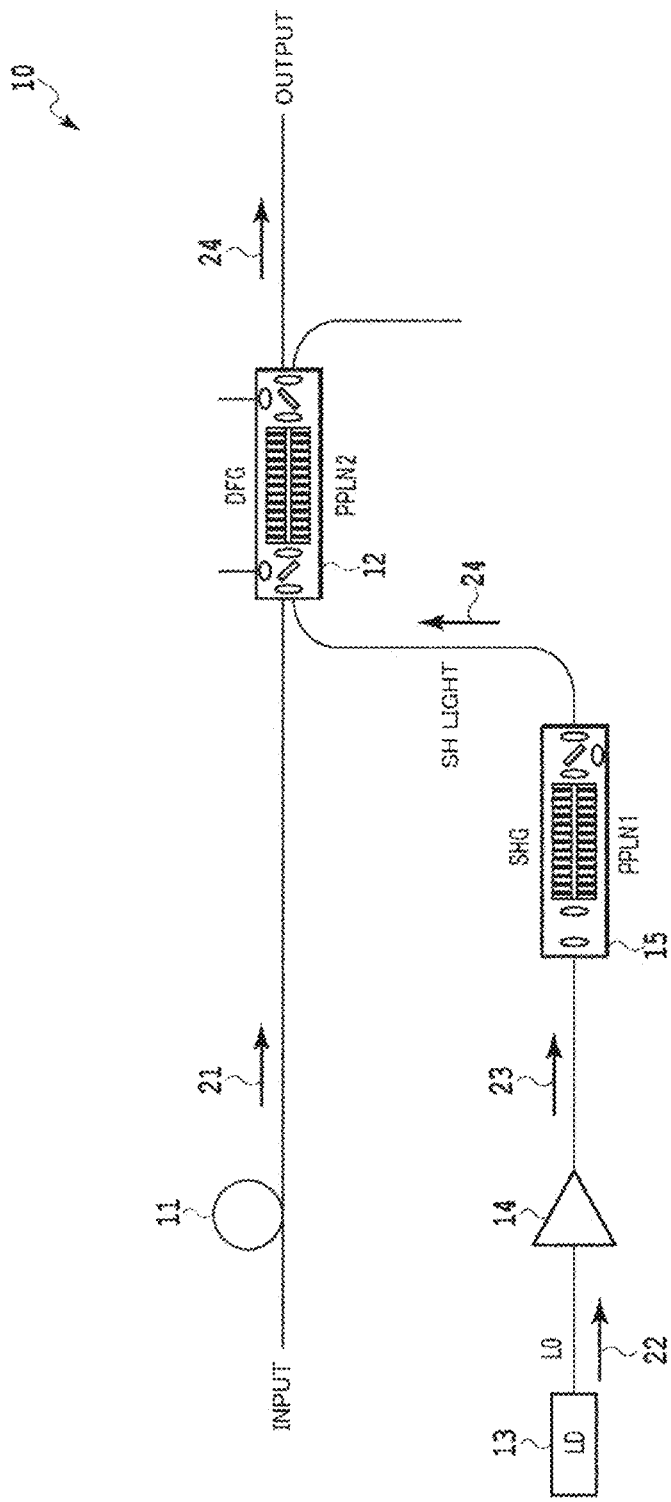
FIG. 1 is a diagram illustrating a basic configuration of a parametric amplifier of the prior art.

An optical amplifier of the present disclosure includes a Raman amplification unit and a parametric amplification unit including a second-order nonlinear element including a PPLN waveguide. Second harmonic lights are generated from a fundamental wave excitation light having a wavelength slightly detuned to a shorter wavelength side with respect to a phase matching wavelength of the second-order nonlinear element of the parametric amplification unit, and utilized as the excitation light for the parametric amplification unit. By utilizing the excitation light based on the fundamental wave light with a wavelength detuned from the phase matching wavelength, a wide phase matching curve can be obtained in a difference frequency generation (DFG) process of the second-order nonlinear element. The reduction in the conversion efficiency (gain) of the near wavelength of the excitation light in the parametric amplification unit is compensated for by the Raman amplification unit disposed therebefore, and a wide bandwidth is realized throughout the optical amplifier. The excitation light for the Raman amplification unit is propagated through the second-order nonlinear element for the short wavelength band of the parametric amplification unit in a direction opposite to the signal light to perform parametric amplification, and a sufficient level for Raman amplification can be secured.

As described above, the configuration of the optical amplifier of the present disclosure is a combination of the Raman amplification unit and the parametric amplification unit, but the operation thereof is usually not utilized. To clarify this, the operation of each amplifying mechanism will be briefly described first.

Optical amplification using a laser medium using rare earth such as the EDFA described above uses transition between energy levels of rare earth. For this reason, there is only a choice of the wavelength band which can be amplified by the EDFA. The fiber Raman amplification and the parametric amplification using a second-order or third-order nonlinear optical medium are known as optical amplification which is not limited in the wavelength band that it can amplify.

In the fiber Raman amplification, the fact that an amplification phenomenon due to stimulated Raman scattering occurs when light having a frequency shifted by an optical phonon is input to an optical fiber on which strong pump light is incident is used. In a case where a general optical fiber is used, in the fiber Raman amplification, a gain band exists with a frequency (corresponding to a wavelength away from about 100 nm in the 1.5 µm band) separated from the pump light by about 12 THz as a peak. By causing a plurality of pump light beams with different wavelengths to enter the optical fiber, a wider band amplifier can be obtained. However, the band which can be amplified is limited to about 80 nm due to the relation between the gain band and the pump light wavelength band. Further, the difference in the noise figure is large depending on the wavelength, and an S/N ratio is varied. Therefore, the advantage of replacing the EDFA with the fiber Raman amplification was not large.

In parametric amplification, there is a third-order nonlinear optical medium utilizing four-wave mixing in an optical fiber. However, since the nonlinear optical effect of the optical fiber may also cause the S/N ratio of the optical signal to deteriorate as described above, it has a problem as a low-noise optical amplifier. On the other hand, there is a method of using an optical waveguide composed of periodically poled lithium niobate (PPLN) as the second-order nonlinear optical medium. For example, in Non Patent Literature 1, it is shown that a wide-band optical amplification operation using PPLN can be performed using a differential frequency generation (DFG) process which is the second-order nonlinear optical effect. Since the third-order nonlinear effect can be ignored in the method using PPLN, deterioration of the signal quality due to the nonlinear optical effect can be considered to substantially not occur.

FIG. 1 is a diagram illustrating a basic configuration of a parametric amplifier of the prior art. A parametric amplifier 10 (hereinafter referred to as an optical amplifier) in FIG. 1 uses a second-order nonlinear optical medium such as a PPLN waveguide disclosed in Non Patent Literature 2. As will be described later, an optical amplifier 1 also functions as a wavelength converter. In the optical amplifier 1 illustrated in FIG. 1, two second-order nonlinear optical elements 12 and 15 using the PPLN waveguides having the same pseudo phase matching condition are utilized. Fundamental wave light 22 of 1,550 nm band is generated from a laser light source 13 used for optical communication, and the fundamental wave light is amplified using an EDFA 14 in order to obtain power sufficient to obtain a nonlinear optical effect. The amplified fundamental wave light 23 is made incident on a PPLN waveguide of a first second-order nonlinear optical element 15, and a second harmonic 24 (SH light) is generated using a second-harmonic generation (SHG) process.

Therefore, in the parametric amplifier, when the wavelength of the signal light is defined as $\lambda_1$ and the wavelength of the excitation light is defined as $\lambda_3$, wavelength conversion light having a wavelength $\lambda_2$ satisfying the following equation is generated due to the second-order nonlinear optical effect generated in the nonlinear medium of the two second-order nonlinear optical elements 12 and 15.

$$\frac{1}{\lambda_3} = \frac{1}{\lambda_1} + \frac{1}{\lambda_2} \qquad \text{Equation (1)}$$

Signal light 21 passing through an optical fiber 11 and a second harmonic 24 as excitation light are made incident on the PPLN waveguide of the second second-order nonlinear optical element 12 to perform non-degenerate parametric amplification. The second second-order nonlinear optical element 12 outputs amplified light 24 obtained by non-degeneracy parametric amplification of the signal light 21. Further, the second second-order nonlinear optical element 12 also outputs wavelength conversion light (Idler light) corresponding to the frequency difference between the signal light 21 and the second harmonic 24 by the DFG process simultaneously with the optical amplification. On the output side of the second second-order nonlinear optical element 12, only the amplified signal light 24 is extracted to function as an optical amplifier, and only the wavelength conversion light is extracted to function as a wavelength converter.

Figure 2:
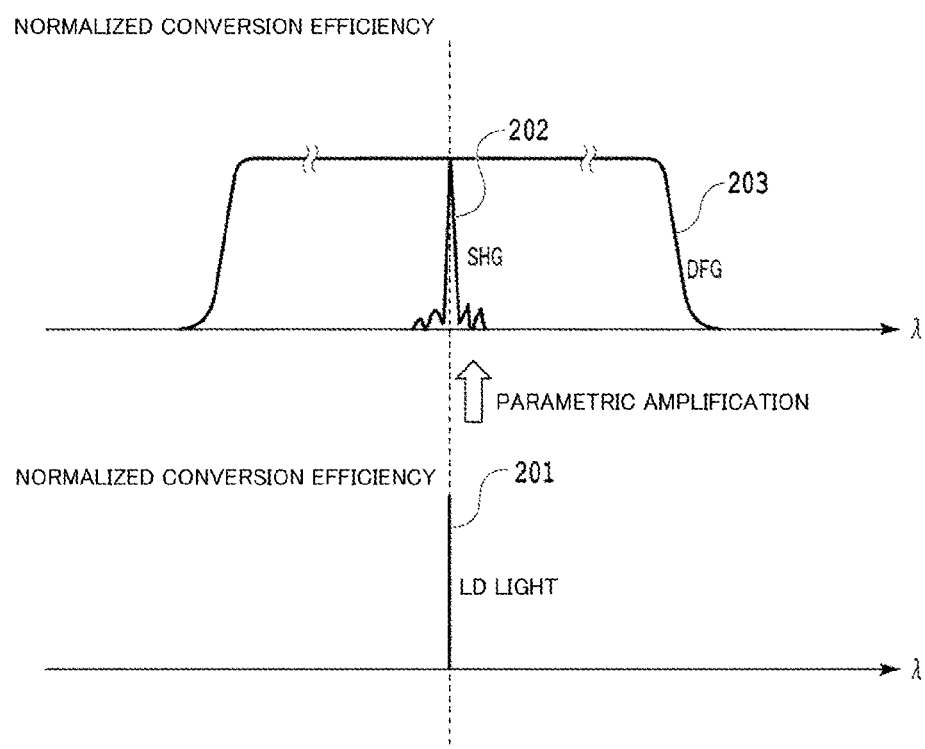
FIG. 2 is a diagram illustrating conversion efficiency of parametric amplification and a DFG process.

FIG. 2 is a diagram illustrating conversion efficiency of parametric amplification and a DFG process. FIG. 2 illustrates the conversion efficiency of each nonlinear process occurring in the PPLN waveguide, and the vertical axis shows the normalized conversion efficiency with respect to the wavelength on the horizontal axis. Although the difference frequency generation (DFG) process is described here, in the parametric amplification process based on the DFG process, the same conversion efficiency, that is, optical amplification capability is shown. It should be noted that the wavelength dependency of the conversion efficiency in FIG. 2 represents a phase matching curve in the PPLN waveguide.

The phase matching wavelength in the PPLN waveguide is an input light wavelength in which the phase velocities of the input light and its second harmonic light match in the SHG process, that is, an input light wavelength satisfying the phase matching condition. When a modulation pitch of a spatial distribution of a nonlinear constant is defined as $\Lambda$, a wavelength of a secondary harmonic is defined as $\lambda_2$, a wavelength of input light is defined as $\lambda_1$, an effective refractive index at $\lambda_1$ in the waveguide is defined as $n_{\lambda 1}$, and an effective refractive index at $\lambda_2$ in the waveguide is $n_{\lambda 2}$, the phase matching condition is given by the following equation.

$$2\pi\left(\frac{n_{\lambda 2}}{\lambda_2} - 2\frac{n_{\lambda 1}}{\lambda_1}\right) = \frac{2\pi}{\Lambda} \qquad \text{Equation (2)}$$

Since the phase matching curve indicates the conversion efficiency of the nonlinear process for each wavelength, the conversion efficiency deteriorates as it departs from a wavelength range satisfying the phase matching condition. Therefore, the phase matching curve indicates the wavelength band satisfying the phase matching condition. FIG. 2 illustrates the wavelength dependency of the conversion efficiency in the DFG process, that is, the phase matching curve.

On the lower side of FIG. 2, there is illustrated a laser beam of a single wavelength output from a laser light source as the conversion efficiency for the fundamental wave light, and the laser beam becomes a linear phase matching line 201 only at a phase matching wavelength determined by a structure such as a periodic structure of the PPLN. The phase matching band of the PPLN waveguide with respect to the second harmonic light generation process is a phase matching curve 202 shown by the SHG on the upper side of FIG. 2. Although the phase matching curve is narrower than the phase matching band of the phase matching curve 203 for the DFG process described below, the line width of the phase matching line 201 of the laser beam of the fundamental wave light is sufficiently wider.

The wavelength conversion efficiency by the DFG process of the PPLN waveguide in a case where the wavelength $\lambda_0$ (frequency: $\omega_0$) of the fundamental wave is 1553 nm and the wavelength $\lambda p$ (frequency: $2\omega_0$) of the excitation light (SH light) is 776.5 nm will be described. By inputting the excitation light and the signal light into the PPLN waveguide, the wavelength conversion light is generated by the DFG process in the PPLN waveguide. For example, if the signal light wavelength $\lambda_s$ (frequency: $\omega_s$) is 1550 nm, the wavelength conversion light having a wavelength of 1556 nm is generated by the DFG process of $(2\omega_0-\omega_s)$. The wavelength conversion light is generated so that its wavelength is a position where the wavelength $\lambda_S$ of the signal light is folded back on a wavelength axis with the wavelength $\lambda_0$ of the fundamental wave as a center. It should be noted that the symmetrical positional relationship of the wavelength conversion light which is a folded position with respect to the fundamental wave is strictly established on the frequency axis.

In the PPLN waveguide, the pseudo phase matching condition is satisfied between the three waves of the excitation light, the signal light, and the conversion light. When the effective refractive indexes of the excitation light, the signal light, and the conversion light in the waveguide are defined as $n_P$, $n_S$, and $n_C$, respectively, the PPLN waveguide has a polarization-reversed structure having an inversion period $\Lambda$ satisfying the following equation.

$$n_P/\lambda_P - n_S/\lambda_S - n_C/\lambda_C = 1/\Lambda \qquad \text{Equation (3)}$$

When an inversion period $\Lambda$ satisfying the relation of Equation (3) is given at a certain wavelength, even if the wavelength $\lambda_S$ of the signal light is changed, the same conversion efficiency can be obtained as long as Equation (3) is satisfied between the wavelength $\lambda_C$ of the conversion light having a frequency $2\omega_0-\omega_S$ and the wavelength $\lambda_P$ of the excitation light. For example, if the signal light wavelength $\lambda_S$ (frequency: $\omega_s$) is 1549 nm, which is different from the 1550 nm of the first example described above, the DFG process of $2\omega_0-\omega_S$ in turn produces wavelength conversion light having a wavelength of 1557 nm. At this time, since the wavelengths of the signal light and the wavelength conversion light are different from those of the first example, the effective refractive indices $n_S$ and $n_C$ also change from the first example of the signal light wavelength $\lambda_S=1550$ nm. However, if nc becomes small by the amount of the increase of $n_S$ due to the dispersion (wavelength dependency) of the material of the PPLN waveguide, Equation (3) can be satisfied even if the wavelength $\lambda_S$ of the signal light is changed. The phase matching conditions in the DFG process are established by the signal light and the wavelength conversion light having a wide range of wavelengths, and a wide wavelength conversion band such as a phase matching curve 203 shown by the DGF is obtained in the upper part of FIG. 2.

Since the dispersion of the material in the PPLN waveguide is not linear, the increase amount of $n_S$ and the decrease amount of $n_C$ are not completely the same. Therefore, the conversion efficiency gradually decreases as it departs from the center wavelength, and the bandwidth satisfying the phase matching condition is limited to a certain range. In the parametric amplification by the PPLN waveguide of the prior art, it is possible to obtain a bandwidth of about 60 nm centered on the fundamental wave wavelength (1553 nm in this example). Here, the bandwidth is assumed to be an interval of 3 dB down points in a power gain. The wavelength band of about 60 nm has a band width capable of being amplified even by an existing EDFA, and the merit of replacing the widely available EDFA with parametric amplification by a PPLN waveguide is small.

In the parametric amplification by the PPLN waveguide of the prior art described above, the phase matching wavelength of the PPLN waveguide is used in a state where it coincides with the wavelength of the fundamental wave excitation light. Therefore, a flat maximum wavelength conversion efficiency (gain) is obtained. The applicant has found the configuration of an optical amplifier that covers a wider wavelength band by operating the PPLN waveguide under a condition different from a condition usually used in parametric amplification of the prior art.

In the optical amplifier of the present disclosure, a second-order nonlinear optical medium such as the PPLN waveguide is used, and the fundamental wave excitation light detuned from the phase matching wavelength is used, so that the gain band of parametric amplification can be varied. In parametric amplification, a phase matching curve having a wider bandwidth than usual is utilized based on a nonlinear phenomenon in the DFG process in a state where it is not normally used, which is intentionally detuned from the phase matching wavelength of the PPLN waveguide. The phase matching curve at this time has a shape having two peaks separated in both directions from the wavelength of the fundamental wave excitation light on the wavelength axis. At the center of the band between the two peaks, the conversion efficiency is lowered and the gain of parametric amplification is also lowered. In the optical amplifier of the present disclosure, the gain reduction in the center of the band is compensated for by a Raman amplification unit disposed before a parametric amplification unit. The bandwidth of the single Raman amplification unit is not replaced by the parametric amplification unit in a normal use state. However, in a case where the detuned fundamental wave excitation light is used, the bandwidth of the Raman amplification unit is sufficient to compensate for a decrease in the gain at the center of the band in the phase matching curve. Hereinafter, a configuration of the optical amplifier of the present disclosure and a manufacturing method thereof will be described with reference to the drawings.

Figure 3:
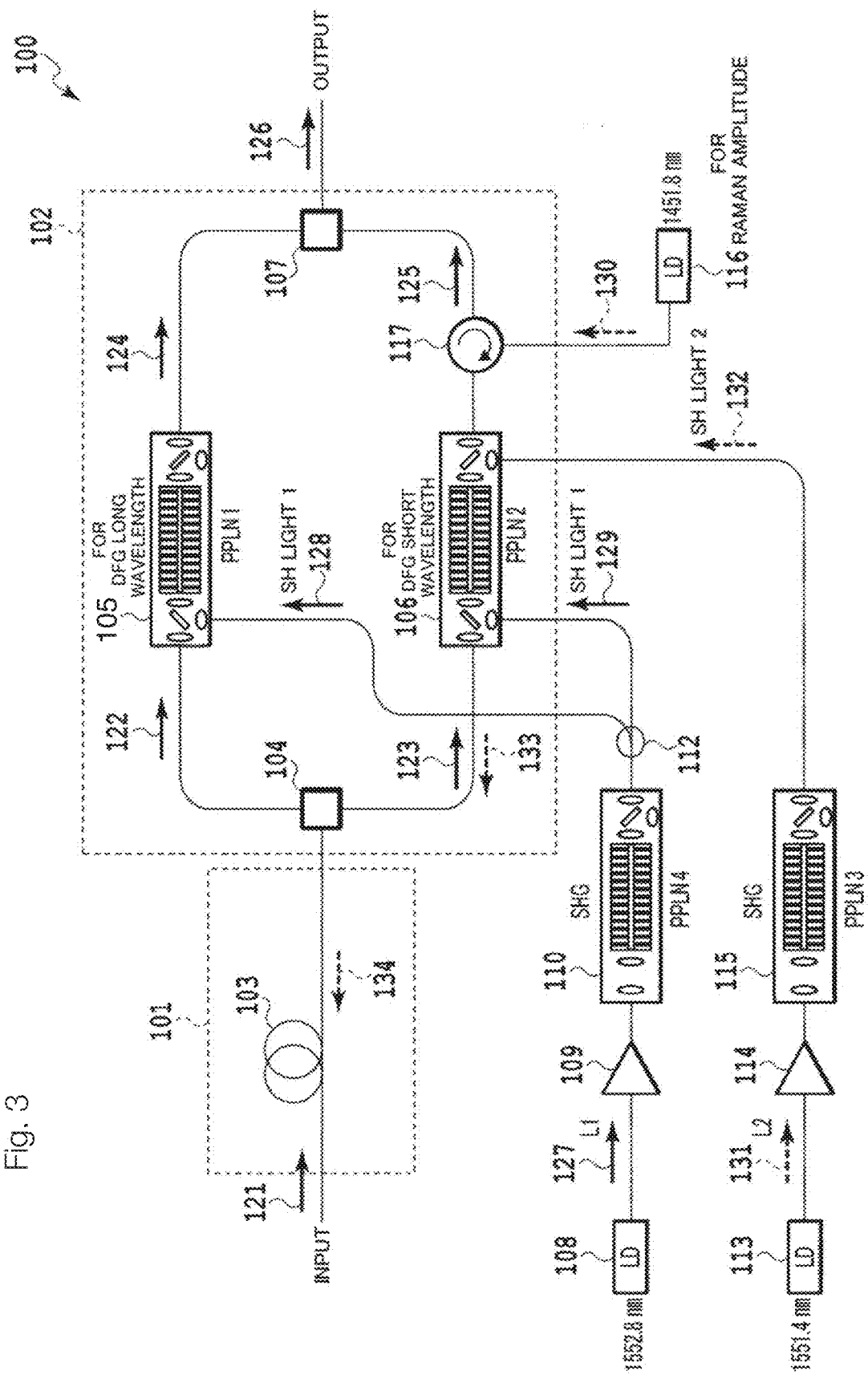
FIG. 3 is a diagram illustrating a configuration of an optical amplifier of the present disclosure.

FIG. 3 is a diagram illustrating a configuration of the optical amplifier of the present disclosure. An optical amplifier 100 illustrated in FIG. 3 is roughly composed of a Raman amplification unit 101 and a parametric amplification unit 102 having second-order nonlinear optical elements 105 and 106 on two paths for a longer wavelength band and a shorter wavelength band, respectively. The Raman amplification unit 101 operates to compensate for gain reduction at the center of the phase matching band in the parametric amplification unit 102. The excitation light of different wavelengths for the signal light and the Raman amplification excitation light is supplied to the parametric amplification unit 102. Excitation light 130 for Raman amplification is propagated through the second-order nonlinear optical element 106 of the path for the shorter wavelength band in the opposite direction to the signal light, and is parametric-amplified.

In the Raman amplification unit 101, the signal light 121 to be amplified is input to an optical fiber transmission line 103. Pump light 134 for Raman amplification of 1451.8 nm is input to the optical fiber transmission line 103 from the rear part, and the Raman amplification having a gain peak in the vicinity of 1553 nm can be realized. A method of supplying the pump light 134 will be described later.

The parametric amplification unit 102 further amplifies the signal light amplified by the Raman amplification unit 101 to obtain final output signal light 126. The parametric amplification unit 102 divides the signal light into a band on the longer wavelength side and a band on the shorter wavelength side with respect to the wavelength of fundamental wave light to be described later, and performs non-degenerate parametric amplification for each band through two paths. That is, the parametric amplification unit 102 includes the first second-order nonlinear optical element 105 for the longer wavelength band on the first path and the second second-order nonlinear optical element 106 for the shorter wavelength band on the second path.

The signal light from the Raman amplification unit 101 is separated by a first coupler (branching unit) 104 into signal light 122 having the longer wavelength band and signal light 123 having the shorter wavelength band than the wavelength of the fundamental wave light. In the optical amplifier 100 of the present disclosure, signal light having a plurality of wavelength multiplexed wavelengths is assumed as input signal light 121, and the signal light is separated into two signal light beams 122 and 123 by the first coupler (branching unit) 104. The signal light 122 and excitation light 128 which is the second harmonic light (SH light 1) of the fundamental wave are made incident on the PPLN waveguide for the DFG of the first second-order nonlinear optical element 105 to perform non-degenerate parametric amplification, and the amplified light 124 of the signal light 122 is outputted. Similarly, the signal light 123 and the excitation light 129, which is the second harmonic light (SH light 1) of the fundamental wave, are made incident on the PPLN waveguide for the DFG of the second second-order nonlinear optical element 106 to perform non-degenerate parametric amplification, and the amplified light 125 of the signal light 123 is output.

Simultaneously with the above-mentioned non-degenerate parametric amplification, the wavelength conversion light (Idler light) corresponding to the difference between the frequency of the signal light and the frequency of the second harmonic is also output in each of the second-order nonlinear optical elements 105 and 106 by the DFG process. Unnecessary wavelength conversion light from the second-order nonlinear optical elements 105 and 106 is removed by a second coupler 107, and amplified signal lights from the two paths are multiplexed, and final output signal light 126 is outputted. Therefore, the filter characteristic of the second coupler 107 for the first path has a low-pass characteristic that passes through the longer wavelength band (the low frequency side) and blocks the shorter wavelength band (the high frequency side). On the other hand, the filter characteristic of the second coupler 107 for the second path has a high pass characteristic that passes through a shorter wavelength band (a high frequency side) and blocks a longer wavelength band (a low frequency side). As a whole of the parametric amplification unit 102, the optical amplifier operates as a single optical amplifier except the vicinity of the wavelength of the fundamental wave light at the boundary of the two bands.

The parametric amplification unit 102 described above is provided with a first excitation light generation unit for supplying excitation light beams 128 and 129 for the signal light and a second excitation light generation unit for supplying excitation light 132 for the pump light for Raman amplification. In the first excitation light generation part, fundamental wave light 127 of 1,550 nm band is generated from a laser light source 108, and the fundamental wave light is amplified using an EDFA 109 in order to obtain power sufficient to obtain a nonlinear optical effect. The amplified fundamental wave light is incident on a second-order nonlinear optical element 110 which generates second harmonic light in the SHG process. The generated second harmonic light is branched into two by an optical branch 112, and supplied to each of the second-order nonlinear optical elements 105 and 106 as excitation light beams (SH light 1) 128 and 129.

Similarly, in the second excitation light generating unit for the pump light for Raman amplification, fundamental wave light 131 of 1,550 nm band is generated from a laser light source 113, and the fundamental wave light is amplified using an EDFA 114 in order to obtain power sufficient for obtaining a nonlinear optical effect. The amplified fundamental wave light is incident on a second-order nonlinear optical element 115 which generates second harmonic light in the SHG process. The generated second harmonic light (SH light 2) 132 is supplied to a port of the second second-order nonlinear optical element 106 for the shorter wavelength band opposite to the excitation light 129 for the signal light. Therefore, the excitation light 132 for the Raman amplification pump light propagates from the output side to the input side of the second second-order nonlinear optical element 106 in the direction opposite to the pumping light 129 for the signal light.

Therefore, the optical amplifier 100 of the present disclosure includes a Raman amplification unit 101 for receiving signal light 121, an excitation light generation unit for generating second harmonic lights 128 and 129 from fundamental wave light 127, a parametric amplification unit that is a parametric amplification unit 102 being connected to the Raman amplification unit and including a first branching unit 104 that separates the amplified signal light from the Raman amplification unit into a longer wavelength band and a shorter wavelength band of a wavelength of the fundamental wave light, a first second-order nonlinear element 105 for parametric amplification of the separated signal light on the longer wavelength band using the second harmonic light as excitation light 128, a second second-order nonlinear element 106 for parametric amplification of the separated signal light on the shorter wavelength band using the second harmonic lights as excitation light 129, and a second branching unit 107 that removes wavelength conversion light beams from each of the first second-order nonlinear element and the second second-order nonlinear element, and multiplexes and outputs the amplified signal light beams from the first second-order nonlinear element and the second second-order nonlinear element, and a light source 116 for generating excitation light (pump light) for the Raman amplification unit, the excitation light 130 propagating through the second second-order nonlinear element in a direction opposite to the signal light, and being parametric-amplified and supplied to the Raman amplification unit, in which the fundamental wave light 127 has a wavelength detuned to a shorter wavelength side than phase matching wavelengths of the first second-order nonlinear element and the second second-order nonlinear element.

Each of the second-order nonlinear optical elements 110 and 115 for the SHG process described above uses a PPLN waveguide having the same pseudo phase matching condition as that of the first second-order nonlinear optical element 105 and the second second-order nonlinear optical element 106 of the parametric amplification unit 102. The first second-order nonlinear element and the second second-order nonlinear element are composed of a nonlinear medium and include a waveguide made of lithium niobate having a periodic polarization-reversed structure. In addition, the nonlinear optical medium is a nonlinear optical crystal and contains at least one of $LiNbO_3$, $LiTaO_3$, or $LiNb_{(x)}Ta_{(1-x)}O_3$ ($0 \leq x \leq 1$), or contains at least one selected from the group consisting of Mg, Zn, Sc, and In as an additive in the above substances. Next, the operations of the second-order nonlinear optical elements 105 and 106 in the parametric amplification unit 102 will be described.

Figure 4:
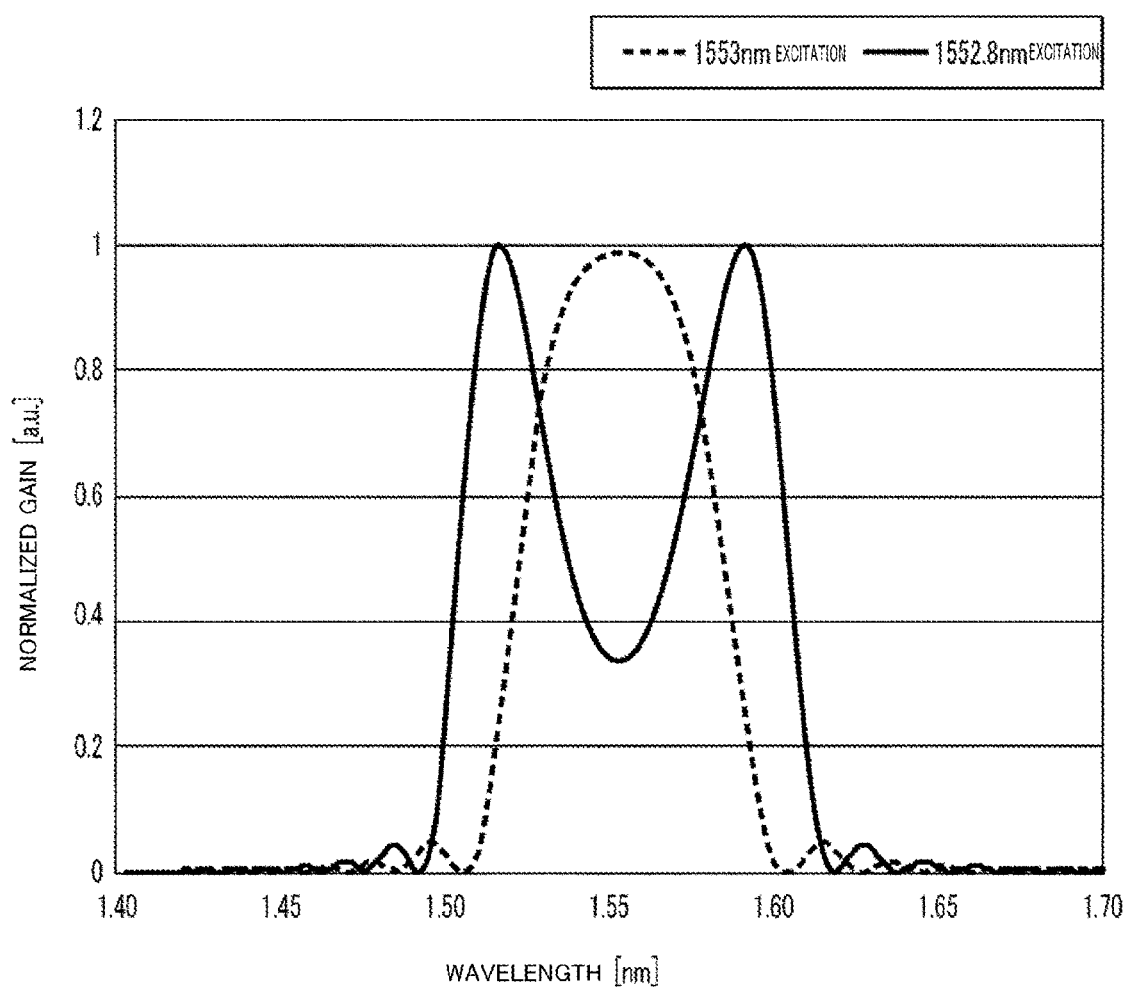
FIG. 4 is a diagram illustrating band characteristics of a parametric amplification gain of the optical amplifier.

FIG. 4 is a diagram illustrating band characteristics of a parametric amplification gain of the optical amplifier of the present disclosure. The vertical axis shows the normalized gain (a.u.), and the horizontal axis shows the wavelength (nm). The second-order nonlinear optical elements (PPLN1 and PPLN2) used for parametric amplification in the optical amplifier 100 illustrated in FIG. 3 use a PPLN waveguide of 45 mm length, and the phase matching wavelength is set to 1553 nm. When second harmonic light beams 128 and 129 generated from fundamental wave light of 1553 nm same as the phase matching wavelength are made incident on the PPLN waveguide as excitation light as in the prior art, the bandwidth of the normalized gain becomes about 60 nm around 1553 nm.

On the other hand, in the optical amplifier 100 of the present disclosure, the fundamental wave light 127 of 1552.8 nm detuned by 0.2 nm slightly to the short wavelength side from the phase matching wavelength is output from the laser light source 108. The excitation light generated from this fundamental wave light is incident on the PPLN waveguide. The normalized gain of the parametric amplification obtained at this time shows a band characteristic in which the gain peak is divided into two as illustrated in FIG. 4. Although the normalized gain near the phase matching wavelength is lower than that in the case of using the fundamental wave light of 1553 nm coinciding with the phase matching wavelength for generating the excitation light, a wavelength band farther from the phase matching wavelength can be amplified. Therefore, it can be seen that the gain band of parametric amplification can be varied using the fundamental wave excitation light detuned from the phase matching wavelength in the second-order nonlinear optical medium such as the PPLN waveguide. There is a gain peak movement of about 18 nm between the detuning amount of the fundamental wave excitation light from the phase matching wavelength and the gain peak movement with respect to the detuning amount of 0.1 nm in the detuning range of about 0.2 nm This relation is confirmed, and the position of the gain peak can be controlled using this relation.

In the optical amplifier 100 of the present disclosure, the excitation light is generated from the fundamental wave light detuned from the phase matching wavelength, the band characteristics in which the gain peak in parametric amplification is divided are positively utilized, and a wide-band and flat amplification characteristic is realized by combining with the Raman amplification unit.

Figure 5:
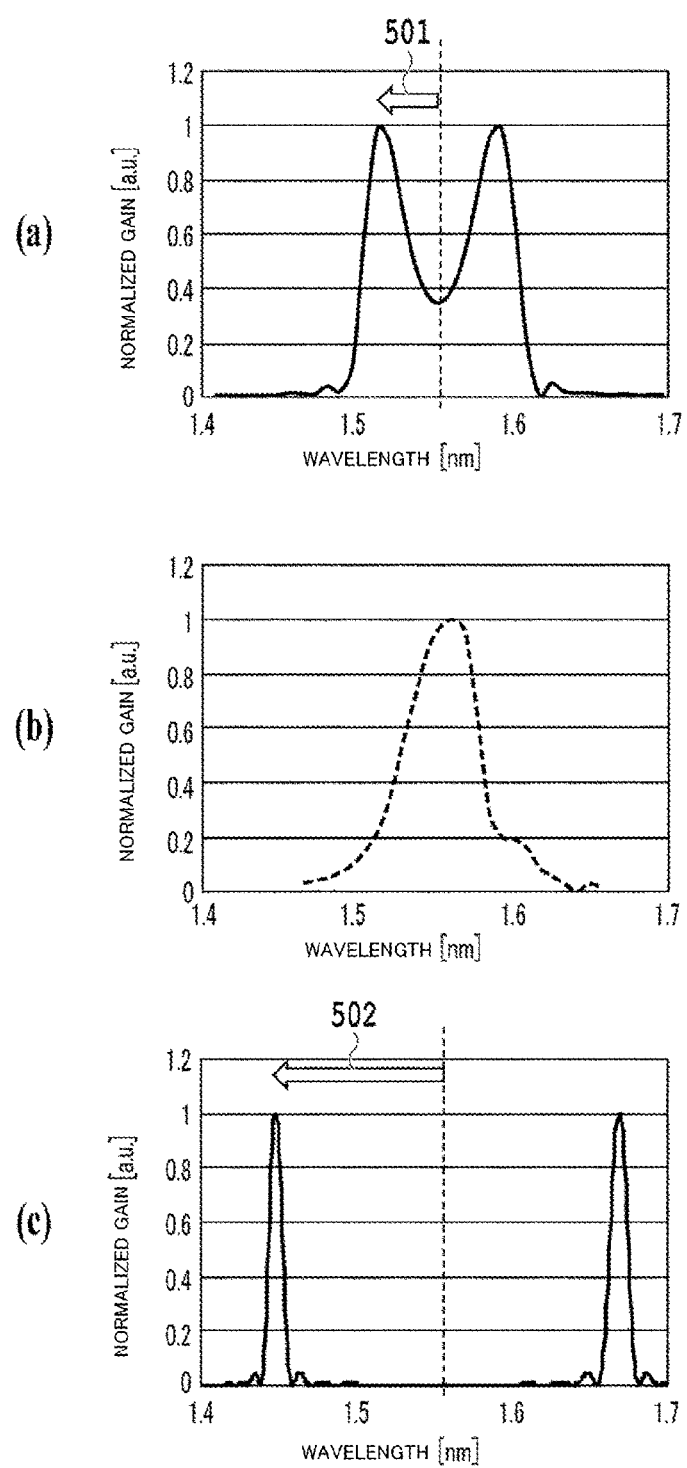
FIG. 5 is a diagram illustrating a standardized gain of each part in the optical amplifier of the present disclosure.

FIG. 5 is a diagram illustrating a standardized gain of each part in the optical amplifier of the present disclosure. Referring to FIG. 3, the relationship between the normalized gains of the parametric amplification unit 102 and the Raman amplification unit 101 will be described. As described above, in the second-order nonlinear optical elements 105 and 106 illustrated in FIG. 3, the excitation light beams 128 and 129 (SH light 1) generated from the fundamental wave light of 1552.8 nm is input to the PPLN waveguides (PPLN1 and PPLN2) having a phase matching wavelength of 1553 nm). As shown in FIG. 5(*a*), the normalized gain at this time is obtained by decreasing the gain at the center phase matching wavelength and moving the peak in both directions by a shift amount 501 on the wavelength axis. Since a sufficient amplification gain cannot be obtained in the vicinity of the phase matching wavelength, only the parametric amplification unit 102 cannot be used as a wide-band amplifier. Therefore, in order to compensate for the gain decrease in the vicinity of the phase matching wavelength, the Raman amplification unit 101 in the preceding stage is utilized.

The Raman amplification unit 101 amplifies the pump light 130 of 1451.8 nm from the Raman amplification light source 116 by the parametric amplification unit 102 as described later, and supplies the light from the rear of the optical fiber transmission line 103. With the configuration of supplying the pump light illustrated in FIG. 3, the Raman amplification having a gain peak near 1553 nm can be realized in the Raman amplification unit 101. FIG. 5(b) illustrates the normalized gain of the Raman amplification unit 101 at this time.

The pump light 130 for the Raman amplification is input from the output side of the second second-order nonlinear optical element 106 on the short wavelength side path of the parametric amplification unit 102 toward the input side via a circulator 117. In the case of the Raman amplification, the pump light for the Raman amplification is normally inputted immediately after the optical fiber transmission line using a circulator. However, if the circulator is provided on the input side of the parametric amplification unit 102, the optical loss directly deteriorates the noise figure of the parametric amplification unit 102. In the optical amplifier 100 of the present disclosure illustrated in FIG. 3, the circulator 117 is provided on the rear stage side of the second second-order nonlinear optical element 106 in the second path. When viewing the signal light in the propagation direction, the loss circuit is arranged on the rear stage side of the parametric amplification unit 102 after optical amplification, thereby suppressing deterioration of the S/N ratio.

In a case where the circulator 117 is installed on the rear stage side of the second second-order nonlinear optical element 106, the pump light 130 receives an optical loss passing through the PPLN waveguide (PPLN2) and the first coupler (branching unit) 104 when viewed in the propagation direction of the pump light. For this reason, in the optical fiber transmission line 103, sufficient pump optical power for the Raman amplification may not be secured. In the optical amplifier 100 illustrated in FIG. 3, the pump light propagating in the direction opposite to the signal light 123 is parametric-amplified by the second second-order nonlinear optical element 106 by utilizing the bidirectional property of the parametric amplifier using the PPLN waveguide.

As the excitation light 132 for parametric amplification of the pump light, as described above, the second harmonic excitation light 132 (SH light 2) generated by the second-order nonlinear optical element 115 using the fundamental wave light 131 having a diameter of 1551.4 nm is input in the same direction as the pump light 130. FIG. 5(c) illustrates the normalized gain of the second second-order nonlinear optical element 106 in a case where the excitation light generated from the fundamental wave light of 1551.4 nm detuned to the shorter wavelength side by 1.6 nm from the phase matching wavelength is used. The second-order nonlinear optical element 106 has a gain peak at a position separated in both directions by a shift amount 502 (about 100 nm) from the phase matching wavelength on the wavelength axis, and can be amplified at a wavelength of 1451.8 nm of the pump light for the Raman amplification. By a bidirectional property of the parametric amplifier, the amplification of the signal light 123 and the pump light 130 are simultaneously optic-amplified, the light loss received by the pump light 130 is compensated by the parametric amplification unit 102, and the pump light 134 with sufficient optical power can be obtained. A sufficient Raman gain can be obtained by the Raman amplification unit 101.

Figure 6:
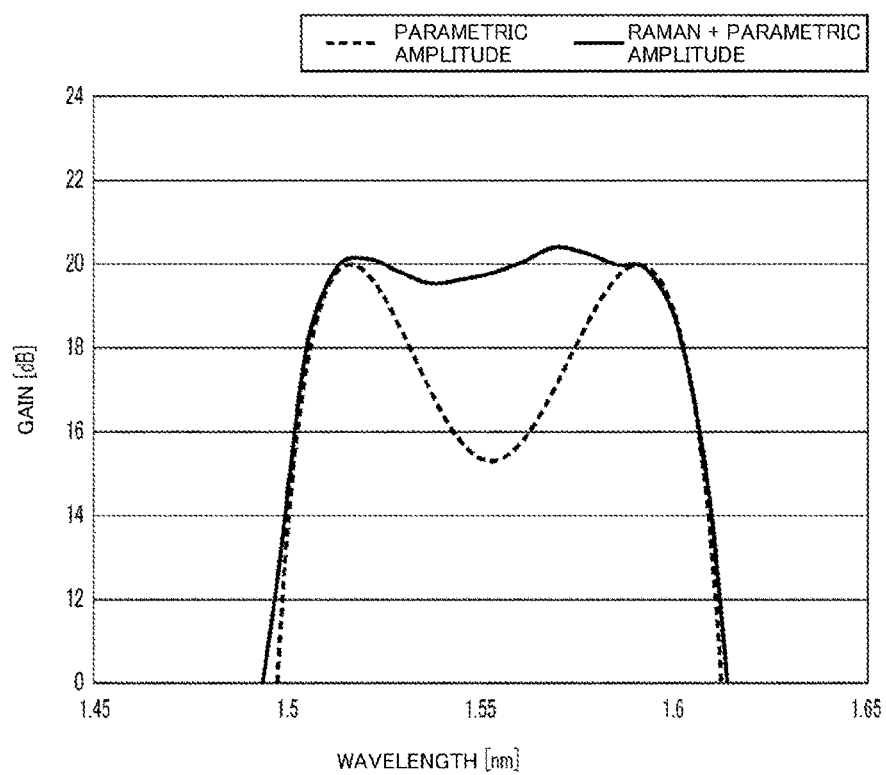
FIG. 6 is a diagram illustrating the band characteristics of the gain of the disclosed optical amplifier.

FIG. 6 is a diagram illustrating the band characteristics of the gain of the optical amplifier of the present disclosure. The vertical axis represents the gain (dB) and the horizontal axis represents the wavelength (nm). In the case of only the parametric amplifier without including the Raman amplifier, the band characteristic of the gain has two peaks as shown by a dotted line, and a high gain is obtained only in a narrow wavelength range. On the other hand, according to the configuration of the optical amplifier of the present disclosure combining Raman amplification and parametric amplification, the band characteristic of the gain is flat as shown by a solid line, and a gain exceeding 18 dB in a wavelength band of about 100 nm can be obtained. In the optical amplifier 100 of the present disclosure, wide wavelength bands including C, L and S bands, which cannot be realized by the conventional optical amplifier, can be collectively amplified.

In the above description, as the excitation light for the signal light amplification of the parametric amplification unit, an example of the second harmonic generated from the fundamental wave of 1552.8 nm detuned to the shorter wavelength side by 0.2 nm from the phase matching wavelength of 1553 nm is shown. However, the wavelength of the excitation light is not limited to this, and the gain peak position of the parametric amplifier can be controlled by changing the amount of detuning from the phase matching wavelength of the PPLN waveguide of the parametric amplifier. Further, the wavelength and the number of the pump light beams for the Raman amplification unit may be changed. Accordingly, the wavelength and the number of the fundamental wave excitation light for amplifying the pump light are changed. For example, in the case where pump light of two different wavelengths is used for the Raman amplification unit, the corresponding excitation light generation unit is provided. Further, the phase matching wavelength of the PPLN waveguide of the parametric amplification unit is not limited to 1553 nm described in the example of the configuration illustrated in FIG. 3, but may be changed to another wavelength, and the PPLN waveguide adapted to the phase matching wavelength may be prepared.

As described in detail above, the optical amplifier of the present disclosure can realize optical amplification capable of amplifying an optical signal with a wide bandwidth including a wavelength band that cannot be amplified by the EDFA.

INDUSTRIAL APPLICABILITY

The present invention can be used for communication, and can be effectively used especially for optical communication.

The invention claimed is:
1. An optical amplifier comprising:
a Raman amplification unit for receiving signal light;
an excitation light generation unit for generating a second harmonic light from fundamental wave light;
a parametric amplification unit being connected to the Raman amplification unit and including:
a first branching unit that separates the amplified signal light from the Raman amplification unit into a longer wavelength band and a shorter wavelength band of a wavelength of the fundamental wave light;

a first second-order nonlinear element for parametric amplification of the separated signal light on the longer wavelength band using the second harmonic light as excitation light;

a second second-order nonlinear element for parametric amplification of the separated signal light on the shorter wavelength band using the second harmonic light as excitation light; and a second branching unit that removes wavelength conversion lights from each of the first second-order nonlinear element and the second second-order nonlinear element, and multiplexes and outputs the amplified signal lights from the first second-order nonlinear element and the second second-order nonlinear element; and a light source for generating excitation light for the Raman amplification unit, the excitation light propagating through the second second-order nonlinear element in a direction opposite to the signal light, and being parametric-amplified and supplied to the Raman amplification unit, wherein the fundamental wave light has a wavelength detuned to a shorter wavelength side than phase matching wavelengths of the first second-order nonlinear element and the second second-order nonlinear element.

2. The optical amplifier according to claim 1, further comprising:

a second excitation light generation unit including a third second-order nonlinear element and generating second excitation light for performing parametric amplification at the wavelength of the excitation light of the Raman amplification unit, the third second-order nonlinear element having the phase matching wavelength, wherein the second excitation light is second harmonic light of second fundamental wave light, and the second fundamental wave light has a wavelength detuned further shorter wavelength side than the fundamental wave light.

3. The optical amplifier according to claim 2, the excitation light generation unit including a fourth second-order nonlinear element and generating the second harmonic light of the fundamental wave light, the fourth second-order nonlinear element having the phase matching wavelength.

4. The optical amplifier according to claim 1, wherein the first second-order nonlinear element and the second second-order nonlinear element are formed of a nonlinear medium and include a waveguide formed of lithium niobate having a periodically polarization-reversed structure, and when the wavelength of the signal light is defined as $\lambda_1$ and the wavelength of the excitation light is defined as $\lambda_3$, the wavelength conversion light of a wavelength $\lambda_2$ is generated by a second-order nonlinear optical effect occurring in the nonlinear medium, the wavelength $\lambda_2$ satisfying an equation of:

$$\frac{1}{\lambda_3} = \frac{1}{\lambda_1} + \frac{1}{\lambda_2}.$$

5. The optical amplifier according to claim 4, wherein the nonlinear medium is a nonlinear optical crystal and contains at least one of $LiNbO_3$, $LiTaO_3$, or $LiNb_{(x)}Ta_{(1-x)}O_3$ ($0 \leq x \leq 1$), or contains at least one additive selected from the group consisting of Mg, Zn, Sc, and In.

* * * * *